United States Patent
Chen et al.

(10) Patent No.: US 10,433,297 B2
(45) Date of Patent: Oct. 1, 2019

(54) COMMUNICATION PROCESSING METHOD, COMMUNICATION PROCESSING APPARATUS AND BASE STATION

(71) Applicant: China Mobile Communications Corporation, Beijing (CN)

(72) Inventors: Zhuo Chen, Beijing (CN); Xiaodong Xu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 254 days.

(21) Appl. No.: 15/125,682

(22) PCT Filed: Mar. 13, 2015

(86) PCT No.: PCT/CN2015/074147
§ 371 (c)(1),
(2) Date: Sep. 13, 2016

(87) PCT Pub. No.: WO2015/135491
PCT Pub. Date: Sep. 17, 2015

(65) Prior Publication Data
US 2017/0006603 A1    Jan. 5, 2017

(30) Foreign Application Priority Data
Mar. 13, 2014    (CN) .......................... 2014 1 0092885

(51) Int. Cl.
*H04W 72/04*    (2009.01)
*H04W 48/10*    (2009.01)
*H04W 88/10*    (2009.01)

(52) U.S. Cl.
CPC ....... *H04W 72/0426* (2013.01); *H04W 48/10* (2013.01); *H04W 72/04* (2013.01); *H04W 72/048* (2013.01); *H04W 88/10* (2013.01)

(58) Field of Classification Search
CPC .......... H04W 72/0426; H04W 72/048; H04W 72/04; H04W 88/10
See application file for complete search history.

(56) References Cited

U.S. PATENT DOCUMENTS 6,678,281 B1 *    1/2004    Chakrabarti .......... H04W 88/18
                                                                370/438
8,532,033 B2 *    9/2013    Henriksson ......... H04W 72/087
                                                                370/329
(Continued)

FOREIGN PATENT DOCUMENTS

CN    102340888 A    2/2012
CN    103533662 A    1/2014
(Continued)

OTHER PUBLICATIONS

Harry Newton, Newton's Telecom Dictionary 27th Edition, 2013, Flatiron Publlishing, p. 188.*
(Continued)

*Primary Examiner* — Maharishi V Khirodhar
*Assistant Examiner* — Kenneth P Hunt
(74) *Attorney, Agent, or Firm* — Arch & Lake LLP

(57) ABSTRACT

The present disclosure provides a communication processing method, a communication processing apparatus, and a base station. The communication processing method is used for an SeNB which constitutes a dual-connection radio communication network with an MeNB, including: a first determination step of determining information about currently available service resources for distribution, in accordance with a resource condition, an admission control step of performing service admission processing on at least one first service in accordance with the information about the service resources, and a transmission step of transmitting service admission information indicating a service admission processing result to the MeNB so as to enable the (Continued)

---

S400
determining information about currently available service resources for distribution, in accordance with a resource condition S402
performing service admission processing on at least one first service in accordance with the information about the service resources S404
transmitting service admission information indicating a service admission processing result to the MeNB MeNB to perform service processing in accordance with the service admission information.

12 Claims, 7 Drawing Sheets

(56) References Cited

U.S. PATENT DOCUMENTS

| | | | | |
|---|---|---|---|---|
| 2004/0202180 | A1* | 10/2004 | Montes Linares .... | H04W 28/16 370/395.2 |
| 2005/0185655 | A1* | 8/2005 | Blanc .................... | H04W 28/16 370/395.41 |
| 2005/0195760 | A1* | 9/2005 | Lee ..................... | H04L 12/1877 370/312 |
| 2005/0232176 | A1* | 10/2005 | Van Lieshout ......... | H04W 4/06 370/312 |
| 2006/0099956 | A1* | 5/2006 | Harada .................. | H04W 74/02 455/452.2 |
| 2007/0076653 | A1* | 4/2007 | Park ..................... | H04L 12/4633 370/328 |
| 2007/0207806 | A1* | 9/2007 | Shaheen ............... | H04W 68/00 455/436 |
| 2007/0242637 | A1* | 10/2007 | Dynarski ................ | H04L 12/66 370/331 |
| 2007/0287467 | A1* | 12/2007 | Oswal ................... | H04W 28/24 455/452.2 |
| 2010/0309859 | A1* | 12/2010 | Shin ...................... | H04W 76/11 370/329 |
| 2013/0040683 | A1* | 2/2013 | Siomina ............ | H04W 28/0236 455/517 |
| 2013/0178219 | A1 | 7/2013 | Lee et al. | |
| 2013/0183971 | A1* | 7/2013 | Tamaki ............. | H04W 36/0061 455/436 |
| 2013/0188575 | A1 | 7/2013 | Lee et al. | |
| 2013/0294320 | A1* | 11/2013 | Jactat ................... | H04L 12/189 370/312 |
| 2014/0023045 | A1* | 1/2014 | Li ..................... | H04W 36/0055 370/331 |
| 2014/0134942 | A1* | 5/2014 | Yu ........................ | H04W 24/02 455/7 |
| 2015/0319801 | A1* | 11/2015 | Lee ....................... | H04W 56/00 370/329 |
| 2015/0351139 | A1* | 12/2015 | Zhang ............... | H04W 52/0251 370/329 |
| 2016/0212775 | A1* | 7/2016 | Xu ........................ | H04W 76/10 |
| 2017/0215125 | A1* | 7/2017 | Wu ....................... | H04W 36/00 |

FOREIGN PATENT DOCUMENTS

| | | |
|---|---|---|
| CN | 103533663 A | 1/2014 |
| EP | 1648189 A1 | 4/2006 |
| EP | 1672853 A2 | 6/2006 |
| EP | 2536205 A1 | 12/2012 |
| WO | 2012045328 A1 | 4/2012 |

OTHER PUBLICATIONS

International Search Report for International Application No. PCT/CN2015/074147 with English translation, dated Jun. 16, 2015, 4 pages.
First Office Action issued in corresponding Chinese Application No. 20140092885.2, dated Dec. 20, 2017, 15 pages.
D1-Ericsson; "Deriving X2AP and S1AP signalling elements from non-mobility scenarios," vol. RAN WG3, No. Prague, Czech Republic; (Feb. 9, 2014), XP050738784, Retrieved from the Internet: URL:http://www.3gpp.org/ftp/Meetings_3GPPSYNC/RAN/RAN3/Docs/ [retrieved on Feb. 9, 2014]; Feb. 2014; pp. 1-8.
D3-Lucent Technologies: "RRM aspects for MBMS in LTE", R3-061569 LTE MBMS RRM, 3rd Generation Partnership Project (3GPP), Mobile Competence Centre; 650, F-06921; vol. RAN WG3, No. Seoul, Korea; Oct. 17, 2006, Oct. 17, 2006 (Oct. 17, 2006), XP050160454, [retrieved on Oct. 17, 2006], pp. 1-2.
International Search Report and Written Opinion issued in corresponding International Application No. PCT/CN2015/074147, with English translation, dated Jun. 16, 2015,16 pages.
Supplementary European Search Report issued in corresponding EP Application No. 15 76 2310 dated Feb. 24, 2017, 11 pages.

\* cited by examiner

COMMUNICATION PROCESSING METHOD, COMMUNICATION PROCESSING APPARATUS AND BASE STATION

CROSS-REFERENCE TO RELATED APPLICATION

The present application is the U.S. national phase of PCT Application No. PCT/CN2015/074147 filed on Mar. 13, 2015, which claims a priority of the Chinese Patent Application No. 201410092885.2 filed on Mar. 13, 2014, both of which are incorporated herein by reference in their entirety.

TECHNICAL FIELD

The present disclosure relates to the field of communication technology, in particular to a communication processing method, a communication processing apparatus and a base station.

BACKGROUND

In order to improve network coverage and communication capacity of a system, the $3^{rd}$ Generation Partnership Project (3GPP) is currently studying the deployment of a Small cell in a Long Term Evolution-Advanced (LTE-A) system. As compared with a Macro evolved NodeB (eNB), the so-called Small cell has a main feature of low radio frequency (RF) transmission power, so its coverage is usually smaller than the Macro eNB. Generally, the Small cell is deployed within the existing coverage of the Macro eNB. Depending on different topographic conditions and user requirements, one or more Small cells may be deployed at a particular region, so as to enhance the network coverage, enable radio resource reuse, and increase the system capacity.

In the case that a user is currently located within the coverage of the Macro cell and the Small cell, a Radio Resource Control (RRC) connection with the two base stations may be maintained by the user simultaneously, i.e., the Macro cell and the Small cell may provide services to the user simultaneously and two physical communication links to the Macro cell and Small cell may be maintained by the user. In the case that the two base stations provide services to the user simultaneously, one of them serves as a Master eNB (MeNB) while the other serves as a Slave eNB (SeNB). Usually, the MeNB assists the management of user-control-plane-related information, while the SeNB mainly takes charge of providing radio resources to a User Equipment (UE). Such network architecture is usually called as dual connection. Through the dual-connection technique, it is able to effectively increase uplink and downlink rates for the UE as well as the system capacity. In addition, this technique also has such advantages as signaling optimization and mobility robustness enhancement. FIG. 1 shows a typical dual-connection network architecture, where a terminal may receive signals from the Macro cell and the Small cell simultaneously, and backhaul services may be provided between the Macro cell and the Small cell.

Currently, in the case of the dual connection, a user control plane is managed by the MeNB, and the SeNB mainly takes charge of providing the radio resources for a user plane, as shown in FIG. 2, where dotted lines represent the information transmission for the user plane, while solid lines represent the information transmission for the control plane.

For the dual-connection mechanism, especially in the case that an identical user is served by two base stations, there is an urgent need to find a way to establish the dual connection for the UE. As an initial proposal, after the UE accesses a network via the MeNB, the MeNB may determine whether or not the dual connection is to be established for the UE. In the case that the MeNB determines to establish the dual connection for the UE, it may request the SeNB to provide resources for the UE, or in the case that the SeNB determines to adjust the physical resources previously provided for the UE, it may request the MeNB to modify a dual-connection configuration for the UE again, FIG. 3 shows a specific process which includes the following steps.

Step S300*a*: the MeNB determines to establish the dual connection for the UE, or Step S300*b*: the SeNB modifies the dual-connection configuration previously provided for the UE.

Step S302: the MeNB requests the SeNB to add or modify the dual-connection configuration for the UE.

Step S304: the SeNB performs operations such as admission control in accordance with its own resource condition.

Step S306: the SeNB sends a message to the MeNB to confirm the dual-connection configuration for the UE.

Step S308: the MeNB notifies the UE of the dual-connection configuration.

Step S310: the MeNB notifies the SeNB of user data state information that needs to be transmitted by the SeNB.

Step S312: the MeNB forwards to the SeNB the user data that needs to be transmitted by the SeNB.

Step S314: after the completion of the dual-connection configuration, the UE sends an acknowledgement message to the MeNB.

Step S316: the UE establishes a radio connection with the SeNB.

Step S318: the SeNB notifies the MeNB that a new connection has been established between the UE and the SeNB.

Step S320: the MeNB notifies a Mobile Management Entity (MME) that some data carriers for the UE have been switched to the SeNB.

Step S322: the MME notifies a Serving-Gateway (SGW) that some data carriers for the UE have been switched to the SeNB.

In the related art, in the case that the MeNB establishes or modifies the dual-connection configuration for the UE, the SeNB is considered to have the ability to admit the requirements on the radio resources by default. However, during the actual network deployment, the SeNB, for various reasons, may not provide sufficient resources. At this time, abnormalities may occur at a network side in the case that the MeNB establishes or modifies the dual-connection configuration for the UE using a conventional mode, and the UE does not know how to process the services for which insufficient resources are provided. In addition, in the case that the MeNB requests the SeNB to provide the radio resource configuration to establish the dual connection for the UE, it may probably requests a small quantity of resources, but the SeNB may provide more available resources. At this time, a waste of resources may occur, and thereby the resource utilization rate may be reduced.

However, there is currently no mechanism to handle the above-mentioned problems. In other words, for the radio resources capable of being provided for the UE as the dual connection configuration, a feasible mechanism needs to be provided to the MeNB and the SeNB, so as to coordinate the radio resources between the MeNB and the SeNB, thereby to optimize the use of the radio resources between different network nodes and handle the possible abnormalities.

SUMMARY

An object of the present disclosure is to provide a communication processing method, a communication processing apparatus and a base station, so as to provide dual-connection resources for a UE in accordance with a resource condition of the base station, thereby to optimize the use of radio resources between different network nodes and prevent the occurrence of abnormalities due to the lack of resources.

In one aspect, the present disclosure provides in some embodiments a communication processing method for an SeNB which constitutes a dual-connection radio communication network with an MeNB, including: a first determination step of determining information about currently available service resources for distribution, in accordance with a resource condition, an admission control step of performing service admission processing on at least one first service in accordance with the information about the service resources, and a transmission step of transmitting service admission information indicating a service admission processing result to the MeNB so as to enable the MeNB to perform service processing in accordance with the service admission information.

Alternatively, the first service is a service which is requested by the MeNB to be distributed to the SeNB, and the communication processing method further includes a reception step of receiving from the MeNB a resource request message carrying service attribute information about the first service.

Alternatively, the first service is a service that has been currently transmitted by the SeNB, and the communication processing method further includes a second determination step of determining service attribute information about the first service.

Alternatively, the service attribute information includes a service identifier, and service quality requirement information or resource requirement information corresponding to the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, so as to enable the MeNB to process the services in the first services incapable of being admitted by the SeNB in accordance with the service admission information.

Alternatively, in the case that the SeNB is capable of admitting all services in the first services and includes other available resources for the other services, the service admission information includes third information indicating the other available resources for the other services in the SeNB, so as to enable the MeNB to distribute a second service to the SeNB in accordance with the service admission information.

Alternatively, in the case that the SeNB is incapable of admitting any services in the first services, the service admission information includes fourth information indicating that the SeNB is incapable of admitting the first services, so as to enable the MeNB to process the first services in accordance with the service admission information.

Alternatively, the fourth information is service admission list information that is set to null, service rejection list information including all services in the first services, and/or a rejection message indicating that the first services are rejected to be admitted.

Alternatively, in the case that the SeNB is incapable of admitting any services in the first services, the transmission step further includes notifying the MeNB in an implicit way that the SeNB is incapable of admitting any services in the first services.

Alternatively, the implicit way is a way in which the service admission information does not carry any service identifier in a service admission list or not carry a service admission list field.

Alternatively, the transmission step further includes transmitting the service admission information to the MeNB via a direct communication interface between the SeNB and the MeNB.

Alternatively, the transmission step further includes transferring the service admission information to the MeNB via an intermediate network element simultaneously connected to the SeNB and the MeNB.

In another aspect, the present disclosure provides in some embodiments a communication processing method for an MeNB which constitutes a dual-connection radio communication network with an SeNB, including: a reception step of receiving service admission information indicating a service admission processing result obtained after the SeNB performs service admission processing on at least one first service in accordance with information about currently available service resources for distribution, and a processing step of performing service processing in accordance with the service admission information.

Alternatively, the first service is a service which is requested by the MeNB to be distributed to the SeNB, and the communication processing method further includes a transmission step of transmitting to the SeNB a resource request message carrying service attribute information about the first service.

Alternatively, the first service is a service that has been currently distributed to the SeNB.

Alternatively, the service attribute information includes a service identifier, and service quality requirement information or resource requirement information corresponding to the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, and the processing step further includes performing service processing on the services in the first services incapable of being admitted by the SeNB in accordance with the service admission information.

Alternatively, in the case that the SeNB is capable of admitting all services in the first services and includes other available resources for the other services, the service admission information includes third information indicating the other available resources for the other services in the SeNB, and the processing step further includes distributing a second service to the SeNB in accordance with the service admission information.

Alternatively, in the case that the SeNB is incapable of admitting any services in the first services, the service admission information includes fourth information indicating that the SeNB is incapable of admitting the first services, and the processing step further includes performing service processing on the first services in accordance with the service admission information.

Alternatively, the reception step further includes receiving the service admission information via a direct communication interface between the SeNB and the MeNB.

Alternatively, the reception step further includes receiving the service admission information via an intermediate network element simultaneously connected to the SeNB and the MeNB.

In yet another aspect, the present disclosure provides in some embodiments a communication processing method for one of an MeNB and an SeNB in a dual-connection radio communication network, including: an acquisition step of, through interaction with the other one of the MeNB and the SeNB, acquiring first information about currently available service resources for distribution from the other one of the MeNB and the SeNB, and a control processing step of performing service distribution processing in accordance with second information about its own available service resources for distribution and the first information about the service resources.

Alternatively, in the case that the communication processing method is used for the MeNB, the control processing step further includes: determining newly-added services which need to be distributed to the SeNB in accordance with the second information about its own available service resources for distribution and the first information about the service resources, or determining to-be-replaced services which need to be distributed to the SeNB in accordance with the second information about its own available service resources for distribution and the first information about the service resources.

In still yet another aspect, the present disclosure provides in some embodiments a communication processing apparatus for an SeNB which constitutes a dual-connection radio communication network with an MeNB, including: a first determination module configured to determine information about currently available service resources for distribution in accordance with a resource condition, an admission control module configured to perform service admission processing on at least one first service in accordance with the information about the service resources, and a transmission module configured to transmit service admission information indicating a service admission processing result to the MeNB so as to enable the MeNB to perform service processing in accordance with the service admission information.

Alternatively, the first service is a service which is requested by the MeNB to be distributed to the SeNB, and the communication processing apparatus further includes a reception module configured to receive from the MeNB a resource request message carrying service attribute information about the first service.

Alternatively, the first service is a service that has been currently distributed to the SeNB, and the communication processing apparatus further includes a second determination module configured to determine service attribute information about the first service.

Alternatively, the service attribute information includes a service identifier, and service quality requirement information or resource requirement information corresponding to the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, so as to enable the MeNB to process the services in the first services incapable of being admitted by the SeNB in accordance with the service admission information.

Alternatively, in the case that the SeNB is capable of admitting all services in the first services and includes other available resources for the other services, the service admission information includes third information indicating the other available resources for the other services in the SeNB, so as to enable the MeNB to distribute a second service to the SeNB in accordance with the service admission information.

Alternatively, in the case that the SeNB is incapable of admitting any services in the first services, the service admission information includes fourth information indicating that the SeNB is incapable of admitting the first services, so as to enable the MeNB to process the first services in accordance with the service admission information.

Alternatively, the fourth information is service admission list information that is set to null, service rejection list information including all services in the first services, and/or a rejection message indicating that the first services are rejected to be admitted.

Alternatively, in the case that the SeNB is incapable of admitting any services in the first services, the transmission module is further configured to notify the MeNB in an implicit way that the SeNB is incapable of admitting any services in the first services.

Alternatively, the implicit way is a way in which the service admission information does not carry any service identifier in a service admission list or not carry a service admission list field.

Alternatively, the transmission module is further configured to transmit the service admission information to the MeNB via a direct communication interface between the SeNB and the MeNB.

Alternatively, the transmission module is further configured to transfer the service admission information to the MeNB via an intermediate network element simultaneously connected to the SeNB and the MeNB.

In still yet another aspect, the present disclosure provides in some embodiments a base station including the above-mentioned communication processing apparatus.

In still yet another aspect, the present disclosure provides in some embodiments a communication processing apparatus for an MeNB which constitutes a dual-connection radio communication network with an SeNB, including: a reception module configured to receive service admission information indicating a service admission processing result obtained after the SeNB performs service admission processing on at least one first service in accordance with information about currently available service resources for distribution, and a processing module configured to perform service processing in accordance with the service admission information.

Alternatively, the first service is a service which is requested by the MeNB to be distributed to the SeNB, and the communication processing apparatus further includes a transmission module configured to transmit to the SeNB a resource request message carrying service attribute information about the first service.

Alternatively, the first service is a service that has been currently distributed to the SeNB.

Alternatively, the service attribute information includes a service identifier, and service quality requirement information or resource requirement information corresponding to the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, and the processing module is further configured to perform service processing on the services in the first services incapable of being admitted by the SeNB in accordance with the service admission information.

Alternatively, in the case that the SeNB is capable of admitting all services in the first services and includes other available resources for the other services, the service admission information includes third information indicating the other available resources for the other services in the SeNB, and the processing module is further configured to distribute a second service to the SeNB in accordance with the service admission information.

Alternatively, in the case that the SeNB is incapable of admitting any services in the first services, the service admission information includes fourth information indicating that the SeNB is incapable of admitting the first services, and the processing module is further configured to perform service processing on the first services in accordance with the service admission information.

Alternatively, the reception module is further configured to receive the service admission information via a direct communication interface between the SeNB and the MeNB.

Alternatively, the reception module is further configured to receive the service admission information via an intermediate network element simultaneously connected to the SeNB and the MeNB.

In still yet another aspect, the present disclosure provides in some embodiments a base station including the above-mentioned communication processing apparatus.

In still yet another aspect, the present disclosure provides in some embodiments a communication processing apparatus for one of an MeNB and an SeNB in a dual-connection radio communication network, including: an acquisition module configured to, through interaction with the other one of the MeNB and the SeNB, acquire first information about currently available service resources for distribution from the other one of the MeNB and the SeNB, and a control processing module configured to perform service distribution processing in accordance with second information about its own available service resources for distribution and the first information about the service resources.

Alternatively, in the case that the communication processing apparatus is used for the MeNB, the control processing module further includes: a first determination unit configured to determine newly-added services which need to be distributed to the SeNB in accordance with the second information about its own available service resources for distribution and the first information about the service resources, or a second determination unit configured to determine to-be-replaced services which need to be distributed to the SeNB in accordance with the second information about its own available service resources for distribution and the first information about the service resources.

According to the communication processing methods, the communication processing apparatuses and the base stations in the embodiments of the present disclosure, it is able to provide the dual-connection resources for a UE in accordance with the resource condition of the base station, thereby to optimize the use of the radio resources between different network nodes and prevent the occurrence of abnormalities due to the lack of resources.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

In the related art, in the case that the dual-connection configuration is provided for a UE, condition information about resources available in a base station is not taken into consideration, so abnormalities may occur at a network side. In addition, the UE does not know how to process the services for which insufficient resources are provided. As a result, a waste of resources may occur, and thereby the resource utilization rate may be reduced. An object of the present disclosure is to provide a communication processing method, a communication processing apparatus and a base station, so as to provide dual-connection resources for the UE in accordance with the resource condition of the base station, thereby to optimize the use of radio resources between different network nodes and prevent the occurrence of abnormalities due to the lack of resources.

Figure 1:
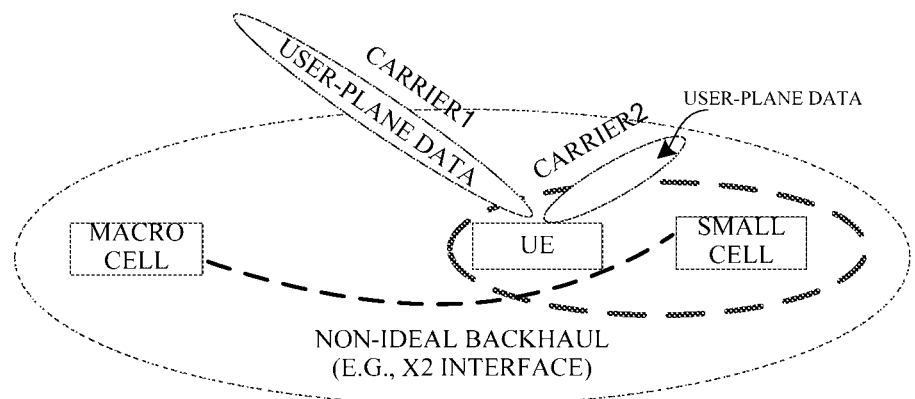
FIG. 1 is a schematic view showing typical dual-connection network architecture.
Figure 2:
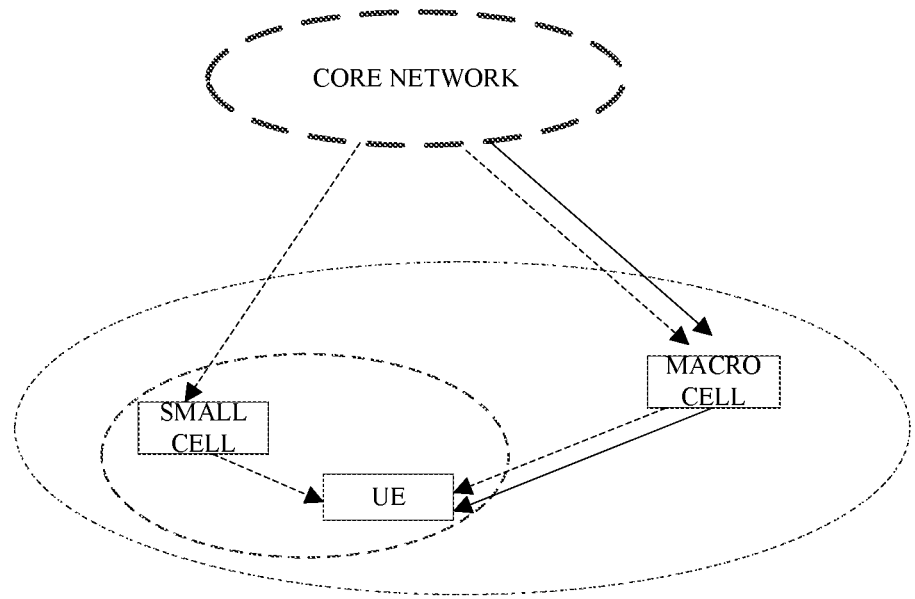
FIG. 2 is a schematic view showing the radio resource transmission for a control plane and a user plane in the case that a dual-connection technique is adopted.
Figure 3:
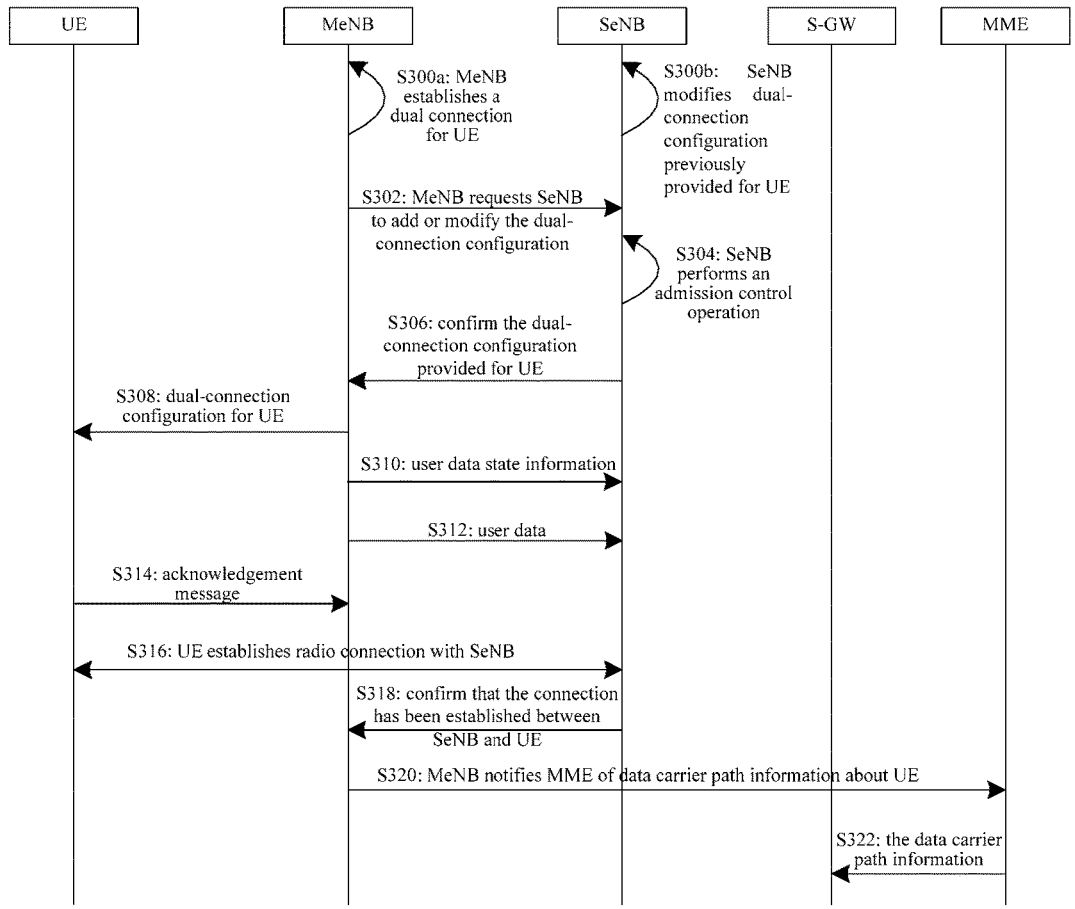
FIG. 3 is a flow chart of a process for establishing and modifying the dual connection in the related art.
Figure 4:
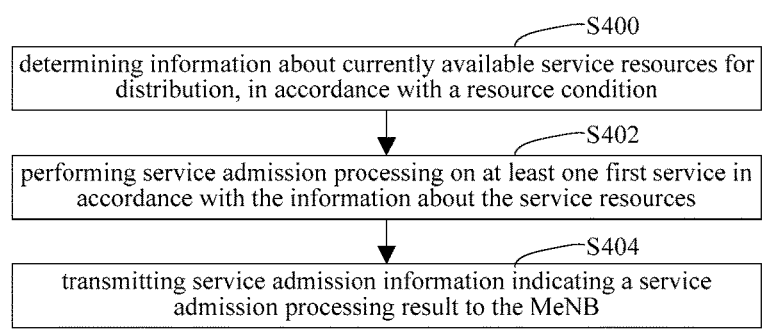
FIG. 4 is a flow chart of a communication processing method according to the first embodiment of the present disclosure.

As shown in FIG. 4, which is a flow chart of a communication processing method according to the first embodiment of the present disclosure, the communication processing method is used for an SeNB which constitutes a dual-connection radio communication network with an MeNB, and it includes: a first determination step S400 of determining information about currently available service resources for distribution, in accordance with a resource condition, an admission control step S402 of performing service admission processing on at least one first service in accordance with the information about the service resources, and a transmission step S404 of transmitting service admission information indicating a service admission processing result to the MeNB so as to enable the MeNB to perform service processing in accordance with the service admission information.

In this embodiment, the communication processing method is used for the SeNB. At first, the information about the service resources for distribution currently available in the SeNB may be determined, and then the at least one first service may be analyzed in accordance with the information about the service resources so as to acquire the service admission information. Next, whether or not the service resources available in the SeNB can meet the service processing requirements may be determined, and the service admission information may be transmitted to the MeNB so that the MeNB may perform the service processing in accordance with the service admission information. In this regard, in the case that the UE is served by the MeNB and the SeNB simultaneously, the MeNB may perform service processing in accordance with the resource condition of the SeNB, i.e., distribute some services to the SeNB, so as to fully utilize the resources in the SeNB and prevent the occurrence of the abnormalities due to the lack of resources in the SeNB.

Alternatively, the first service is a service which is requested by the MeNB to be distributed to the SeNB, and the communication processing method further includes a reception step of receiving from the MeNB a resource request message carrying service attribute information about the first service.

In this embodiment, the service to be currently processed by the SeNB is a service which is requested by the MeNB to be distributed to the SeNB, and the SeNB may acquire and process the service by receiving from the MeNB the resource request message carrying the service attribute information about the service Alternatively, the first service is a service that has been currently distributed to the SeNB, and the communication processing method further includes a second determination step of determining service attribute information about the first service.

In this embodiment, the service to be currently processed by the SeNB is a service that has been currently acquired and needs to be distributed to the SeNB, and the SeNB may determine the service attribute information about the service.

Alternatively, the service attribute information includes a service identifier, and service quality requirement information or resource requirement information corresponding to the service.

In this embodiment, the service attribute information may include the service identifier, and the service quality requirement information or resource requirement information corresponding to the service. Based on the service ID, it is able for the base station to determine the service, and based on the service quality requirement information or the resource requirement information, it is able for the base station to determine the resources desired for the service and thereby allocate the corresponding resources for the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, so as to enable the MeNB to process the services in the first services incapable of being admitted by the SeNB in accordance with the service admission information.

In this embodiment, for the services to be processed by the SeNB, the SeNB can merely process a part of these services, i.e., it may merely provide a part of the resources for the services. At this time, the SeNB may transmit to the MeNB the service admission information indicating the services capable of being admitted by the SeNB or indicating the services incapable of being admitted by the SeNB.

Alternatively, in the case that the SeNB is capable of admitting all services in the first services and includes other available resources for the other services, the service admission information includes third information indicating the other available resources for the other services in the SeNB, so as to enable the MeNB to distribute a second service to the SeNB in accordance with the service admission information.

In this embodiment, for the services to be processed by the SeNB, the SeNB may provide sufficient resources for these services and include remaining resources available for the other services. At this time, the SeNB needs to transmit to the MeNB the service admission information indicating the remaining available resources.

Alternatively, in the case that the SeNB is incapable of admitting any services in the first services, the service admission information includes fourth information indicating that the SeNB is incapable of admitting the first services, so as to enable the MeNB to process the first services in accordance with the service admission information.

In this embodiment, for the services to be processed by the SeNB, the SeNB cannot provide any available resources for these resources. At this time, the SeNB needs to transmit to the MeNB the service admission information indicating that the services cannot be admitted by the SeNB.

Alternatively, the fourth information is service admission list information that is set to null, service rejection list information including all services in the first services, and/or a rejection message indicating that the first services are rejected to be admitted.

In this embodiment, the SeNB cannot provide any resources for the services, and it needs to transmit to the MeNB the service admission information including the service admission list information, the service rejection list information, and/or the rejection message, so as to indicate that the SeNB cannot admit the services.

Alternatively, in the case that the SeNB is incapable of admitting any services in the first services, the transmission step further includes notifying the MeNB in an implicit way that the SeNB is incapable of admitting any services in the first services.

Alternatively, the implicit way is a way in which the service admission information does not carry any service identifier in a service admission list or not carry a service admission list field.

In this embodiment, the SeNB cannot provide any resources for the services, and it needs to transmit to the MeNB a message that does not carry any service admission information. Upon the receipt of the message, the MeNB may determine, by default, that the SeNB cannot admit the services.

Alternatively, the transmission step further includes transmitting the service admission information to the MeNB via a direct communication interface between the SeNB and the MeNB.

In this embodiment, the SeNB and the MeNB may communicate with each other via the direct communication interface, e.g., an X2 interface, so as to transmit the information therebetween.

Alternatively, the transmission step further includes transferring the service admission information to the MeNB via an intermediate network element simultaneously connected to the SeNB and the MeNB.

In some circumstances, it is impossible to provide a direct interface between the SeNB and the MeNB, and at this time, the information may be transferred between the SeNB and the MeNB via any other nodes, e.g., a core network node and an S1 interface.

Figure 5:
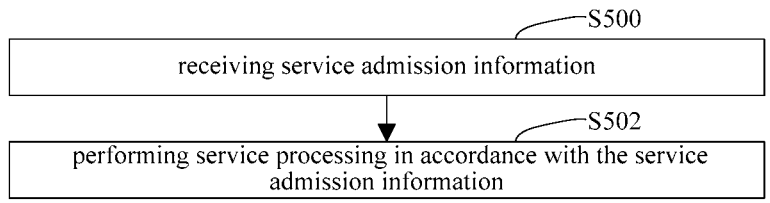
FIG. 5 is a flow chart of a communication processing method according to the second embodiment of the present disclosure.

As shown in FIG. 5, which is a flow chart of a communication processing method according to the second embodiment of the present disclosure, the communication processing method is used for an MeNB which constitutes a dual-connection radio communication network with an SeNB, and it includes: a reception step S500 of receiving service admission information indicating a service admission processing result obtained after the SeNB performs service admission processing on at least one first service in accordance with information about currently available service resources for distribution, and a processing step S502 of performing service processing in accordance with the service admission information.

In this embodiment, the communication processing method is used for the MeNB. The service admission information may be acquired from the SeNB by analyzing the at least one first service in accordance with the information about the currently available service resources for distribution, so as to determine whether or not the service resources available in the SeNB can meet the service processing requirements. Then, the MeNB may perform the service processing in accordance with the service admission information. In this regard, in the case that the UE is served by the MeNB and the SeNB simultaneously, the MeNB may perform service processing in accordance with the resource condition of the SeNB, i.e., distribute to some services to the SeNB, so as to fully utilize the resources in the SeNB and prevent the occurrence of the abnormalities due to the lack of resources in the SeNB.

Alternatively, the first service is a service which is requested by the MeNB to be distributed to the SeNB, and the communication processing method further includes a transmission step of transmitting to the SeNB a resource request message carrying service attribute information about the first service.

In this embodiment, in the case that the MeNB requests the SeNB to process the services, it may transmit to the SeNB the resource request message carrying the service attribute information about the service, so as to enable the SeNB to determine the resource requirement condition in accordance with the service attribute information, thereby to acquire the service admission information.

Alternatively, the first service is a service that has been currently distributed to the SeNB.

Alternatively, the service attribute information includes a service identifier, and service quality requirement information or resource requirement information corresponding to the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, and the processing step further includes performing service processing on the services in the first services incapable of being admitted by the SeNB in accordance with the service admission information.

In this embodiment, for the services to be processed by the SeNB, the SeNB may merely process a part of these services, i.e., the SeNB may merely provide a part of the resources for the services. At this time, the SeNB needs to transmit to the MeNB the service admission information indicating a part of these services capable of being admitted by the SeNB or indicating a part of these services incapable of being admitted by the SeNB. Upon the receipt of the service admission information, the MeNB may perform the service processing on the services incapable of being admitted by the SeNB, e.g., release, or provide the other resources for, the services incapable of being admitted by the SeNB.

Alternatively, Alternatively, in the case that the SeNB is capable of admitting all services in the first services and includes other available resources for the other services, the service admission information includes third information indicating the other available resources for the other services in the SeNB, and the processing step further includes distributing a second service to the SeNB in accordance with the service admission information.

In this embodiment, for the services to be processed by the SeNB, the SeNB may process these services and include remaining resources available for the other services. At this time, the SeNB needs to transmit to the MeNB the service admission information indicating the remaining resources. Upon the receipt of the service admission information, the MeNB may distribute some other services to the SeNB.

Alternatively, in the case that the SeNB is incapable of admitting any services in the first services, the service admission information includes fourth information indicating that the SeNB is incapable of admitting the first services, and the processing step further includes performing service processing on the first services in accordance with the service admission information.

In this embodiment, for the services to be processed by the SeNB, the SeNB cannot provide any resources for these services. At this time, the SeNB needs to transmit to the MeNB the service admission information indicating that the SeNB is incapable of admitting the services. Upon the receipt of the service admission information, the MeNB may perform service processing, e.g., release, or provide the other resources for, these services.

Alternatively, the reception step further includes receiving the service admission information via a direct communication interface between the SeNB and the MeNB.

Alternatively, the reception step further includes receiving the service admission information via an intermediate network element simultaneously connected to the SeNB and the MeNB.

Figure 6:
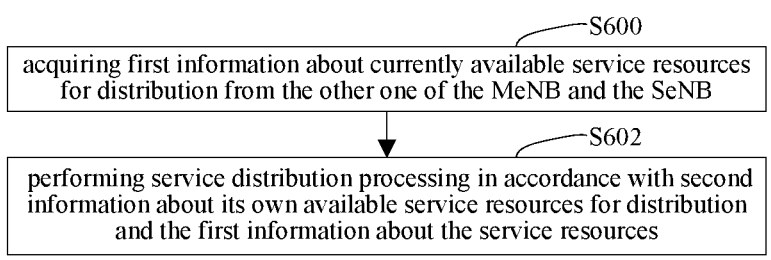
FIG. 6 is a flow chart of a communication processing method according to the third embodiment of the present disclosure.

As shown in FIG. 6, which is a flow chart of a communication processing method according to the third embodiment of the present disclosure, the communication processing method is used for one of an MeNB and an SeNB in a dual-connection radio communication network, and it includes: an acquisition step S600 of, through interaction with the other one of the MeNB and the SeNB, acquiring first information about currently available service resources for distribution from the other one of the MeNB and the SeNB, and a control processing step S602 of performing service distribution processing in accordance with second information about its own available service resources for distribution and the first information about the service resources.

In this embodiment, the communication processing method is used for one of the MeNB and the SeNB. Through the interaction between the MeNB and the SeNB, the one of the MeNB and the SeNB may acquire the information about the service resources from the other one, and then perform the distribution processing on the service in accordance with the information about its own service sources and the information about the service resources from the other one. In this regard, in the case that the UE is served by the MeNB and the SeNB simultaneously, service processing may be performed in accordance with the resource conditions of the MeNB and the SeNB, so as to fully utilize the resources in the SeNB and prevent the occurrence of the abnormalities due to the lack of resources in the SeNB.

Alternatively, in the case that the communication processing method is used for the MeNB, the control processing step further includes: determining newly-added services which need to be distributed to the SeNB in accordance with the second information about its own available service resources for distribution and the first information about the service resources, or determining to-be-replaced services which need to be distributed to the SeNB in accordance with the second information about its own available service resources for distribution and the first information about the service resources.

In this embodiment, in the case that the communication processing method is used for the MeNB, the MeNB may determine the newly-added services to be processed by the SeNB or modify the services to be processed by the SeNB in accordance with the information about its own service resources and the information about the service resources from the SeNB.

Figure 7:
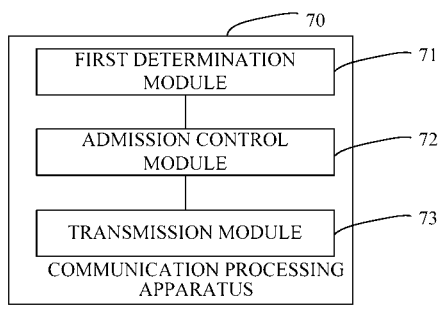
FIG. 7 is a block diagram of a communication processing apparatus according to the first embodiment of the present disclosure.

As shown in FIG. 7, which is a block diagram of a communication processing apparatus 70 according to the first embodiment of the present disclosure, the communication processing apparatus 70 is used for an SeNB which constitutes a dual-connection radio communication network with an MeNB, and it includes: a first determination module 71 configured to determine information about currently available service resources for distribution in accordance with a resource condition, an admission control module 72 configured to perform service admission processing on at least one first service in accordance with the information about the service resources, and a transmission module 73 configured to transmit service admission information indicating a service admission processing result to the MeNB so as to enable the MeNB to perform service processing in accordance with the service admission information.

In this embodiment, the communication processing apparatus is used for the SeNB. The first determination module 71 may determine the information about the service resources for distribution currently available in the SeNB. The admission control module 72 may analyze the at least one first service in accordance with the information about the service resources so as to acquire the service admission information, and determine whether or not the service resources available in the SeNB can meet the service processing requirements may be determined. The transmission module 73 may transmit the service admission information to the MeNB so that the MeNB may perform the service processing in accordance with the service admission information. In this regard, in the case that the UE is served by the MeNB and the SeNB simultaneously, the MeNB may perform service processing in accordance with the resource condition of the SeNB, i.e., distribute some services to the SeNB, so as to fully utilize the resources in the SeNB and prevent the occurrence of the abnormalities due to the lack of resources in the SeNB.

Alternatively, the first service is a service which is requested by the MeNB to be distributed to the SeNB, and the communication processing apparatus further includes a reception module configured to receive from the MeNB a resource request message carrying service attribute information about the first service.

Alternatively, the first service is a service that has been currently distributed to the SeNB, and the communication processing apparatus further includes a second determination module configured to determine service attribute information about the first service.

Alternatively, the service attribute information includes a service identifier, and service quality requirement information or resource requirement information corresponding to the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, so as to enable the MeNB to process the services in the first services incapable of being admitted by the SeNB in accordance with the service admission information.

Alternatively, in the case that the SeNB is capable of admitting all services in the first services and includes other available resources for the other services, the service admission information includes third information indicating the other available resources for the other services in the SeNB, so as to enable the MeNB to distribute a second service to the SeNB in accordance with the service admission information.

Alternatively, in the case that the SeNB is incapable of admitting any services in the first services, the service admission information includes fourth information indicating that the SeNB is incapable of admitting the first services, so as to enable the MeNB to process the first services in accordance with the service admission information.

Alternatively, the fourth information is service admission list information that is set to null, service rejection list information including all services in the first services, and/or a rejection message indicating that the first services are rejected to be admitted.

Alternatively, in the case that the SeNB is incapable of admitting any services in the first services, the transmission module is further configured to notify the MeNB in an implicit way that the SeNB is incapable of admitting any services in the first services.

Alternatively, the implicit way is a way in which the service admission information does not carry any service identifier in a service admission list or not carry a service admission list field.

Alternatively, the transmission module is further configured to transmit the service admission information to the MeNB via a direct communication interface between the SeNB and the MeNB.

Alternatively, the transmission module is further configured to transfer the service admission information to the MeNB via an intermediate network element simultaneously connected to the SeNB and the MeNB.

The present disclosure further provides in some embodiments a base station including the above-mentioned communication processing apparatus.

Figure 8:
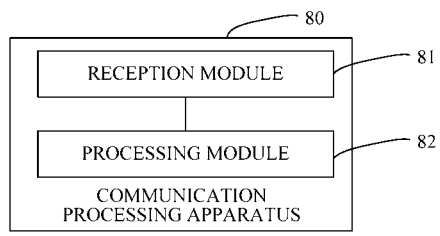
FIG. 8 is a block diagram of a communication processing apparatus according to the second embodiment of the present disclosure.

As shown in FIG. 8, which is a block diagram of a communication processing apparatus 80 according to the second embodiment of the present disclosure, the communication processing apparatus 80 is used for an MeNB which constitutes a dual-connection radio communication network with an SeNB, and it includes: a reception module 81 configured to receive service admission information indicating a service admission processing result obtained after the SeNB performs service admission processing on at least one first service in accordance with information about currently available service resources for distribution, and a processing module 82 configured to perform service processing in accordance with the service admission information.

In this embodiment, the communication processing method is used for the MeNB. The reception module 81 may acquire the service admission information from the SeNB by analyzing the at least one first service in accordance with the information about the currently available service resources for distribution, so as to determine whether or not the service resources available in the SeNB can meet the service processing requirements. The processing module 82 may perform the service processing in accordance with the service admission information. In this regard, in the case that the UE is served by the MeNB and the SeNB simultaneously, the MeNB may perform service processing in accordance with the resource condition of the SeNB, i.e., distribute some services to the SeNB, so as to fully utilize the resources in the SeNB and prevent the occurrence of the abnormalities due to the lack of resources in the SeNB.

Alternatively, the first service is a service which is requested by the MeNB to be distributed to the SeNB, and the communication processing apparatus further includes a transmission module configured to transmit to the SeNB a resource request message carrying service attribute information about the first service.

Alternatively, the first service is a service that has been currently distributed to the SeNB.

Alternatively, the service attribute information includes a service identifier, and service quality requirement information or resource requirement information corresponding to the service.

Alternatively, in the case that the SeNB is capable of merely admitting parts of the services in the first services, the service admission information includes first information indicating the services in the first services capable of being admitted by the SeNB, and/or second information indicating the services in the first services incapable of being admitted by the SeNB, and the processing module is further configured to perform service processing on the services in the first services incapable of being admitted by the SeNB in accordance with the service admission information.

Alternatively, in the case that the SeNB is capable of admitting all services in the first services and includes other available resources for the other services, the service admission information includes third information indicating the other available resources for the other services in the SeNB, and the processing module is further configured to distribute a second service to the SeNB in accordance with the service admission information.

Alternatively, in the case that the SeNB is incapable of admitting any services in the first services, the service admission information includes fourth information indicating that the SeNB is incapable of admitting the first services, and the processing module is further configured to perform service processing on the first services in accordance with the service admission information.

Alternatively, the reception module is further configured to receive the service admission information via a direct communication interface between the SeNB and the MeNB.

Alternatively, the reception module is further configured to receive the service admission information via an intermediate network element simultaneously connected to the SeNB and the MeNB.

The present disclosure further provides in some embodiments a base station including the above-mentioned communication processing apparatus.

Figure 9:
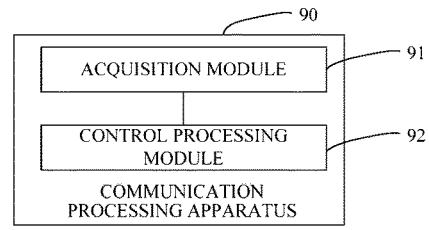
FIG. 9 is a block diagram of a communication processing apparatus according to the third embodiment of the present disclosure.

As shown in FIG. 9, which is a block diagram of a communication processing apparatus 90 according to the third embodiment of the present disclosure, the communication processing apparatus 90 is used for one of an MeNB and an SeNB in a dual-connection radio communication network, and it includes: an acquisition module 91 configured to, through interaction with the other one of the MeNB and the SeNB, acquire first information about currently available service resources for distribution from the other one of the MeNB and the SeNB, and a control processing module 92 configured to perform service distribution processing in accordance with second information about its own available service resources for distribution and the first information about the service resources.

In this embodiment, the communication processing apparatus is used for one of the MeNB and the SeNB. Through the interaction between the MeNB and the SeNB, the acquisition module 91 may acquire the information about the service resources from the other one, and the control processing module 92 may perform the distribution processing on the service in accordance with the information about its own service sources and the information about the service resources from the other one. In this regard, in the case that the UE is served by the MeNB and the SeNB simultaneously, service processing may be performed in accordance with the resource conditions of the MeNB and the SeNB, so as to fully utilize the resources in the SeNB and prevent the occurrence of the abnormalities due to the lack of resources in the SeNB.

Alternatively, in the case that the communication processing apparatus is used for the MeNB, the control processing module further includes: a first determination unit configured to determine newly-added services which need to be distributed to the SeNB in accordance with the second information about its own available service resources for distribution and the first information about the service resources, or a second determination unit configured to determine to-be-replaced services which need to be distributed to the SeNB in accordance with the second information about its own available service resources for distribution and the first information about the service resources.

Figure 10:
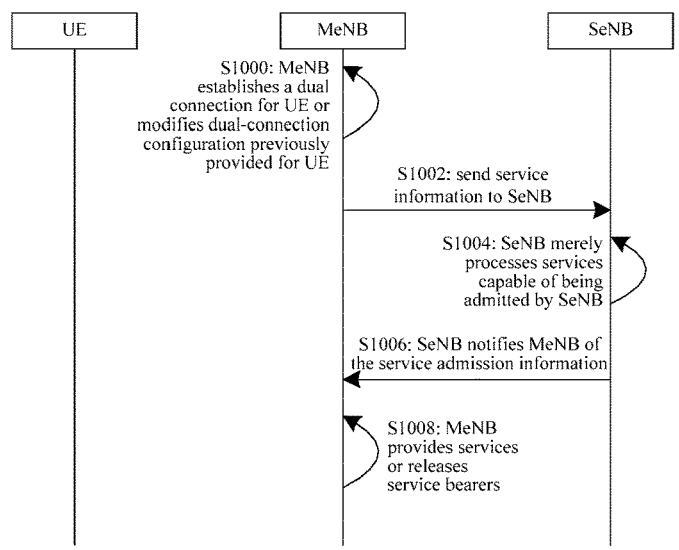
FIG. 10 is a flow chart of a communication processing method according to the fourth embodiment of the present disclosure.

FIG. 10 is a flow chart of a communication processing method according to the fourth embodiment of the present disclosure. In this embodiment, the MeNB initiates a service distribution request to the SeNB, while the SeNB partially accept the request, i.e., it may merely provide a part of the resources desired for processing the services distributed by the MeNB. In this circumstance, the communication processing method includes the following steps.

Step S1000: the MeNB establishes a dual connection for the UE, or modifies the dual-connection configuration previously provided for the UE.

Step S1002: in the case that the MeNB requests the SeNB to add or modify the dual-connection resource configuration for the UE, it transmits to the SeNB service information including service bearers for the resources desired to be provided by the SeNB, and the service information may be a service bearer list carrying the request. For example, the services to be distributed may be stored in E-RAB List Requested to Establish, and this list may be contained in the service information transmitted to the SeNB.

Step S1004: the SeNB performs an admission control operation in accordance with its own resource condition. The SeNB may merely process the services capable of being admitted thereby, and does not process the services incapable of being admitted.

Step S1006: the SeNB sends a request to the MeNB to confirm the dual-connection resource configuration provided for the UE, i.e., notifies the MeNB of the service admission information. The SeNB may notify the MeNB of the bearers capable of being admitted. For example, the SeNB may send to the MeNB a notification message carrying E-RAB List Accepted to Establish, and the information about the services capable of being admitted by the SeNB may be contained in the E-RAB List Accepted to Establish. Alternatively, the SeNB may also notify the MeNB of the bearers incapable of being admitted. For example, the SeNB may send to the MeNB a notification message carrying E-RAB List Not-Accepted, and the information about the services incapable of being admitted by the SeNB may be contained in the E-RAB List Not-Accepted.

Step S1008: after acquiring the service admission information from the SeNB, the MeNB performs the corresponding processings. For the service bearers incapable of being admitted by the SeNB, the MeNB may provide its own resources for these service bearers, or release these service bearers.

Figure 11:
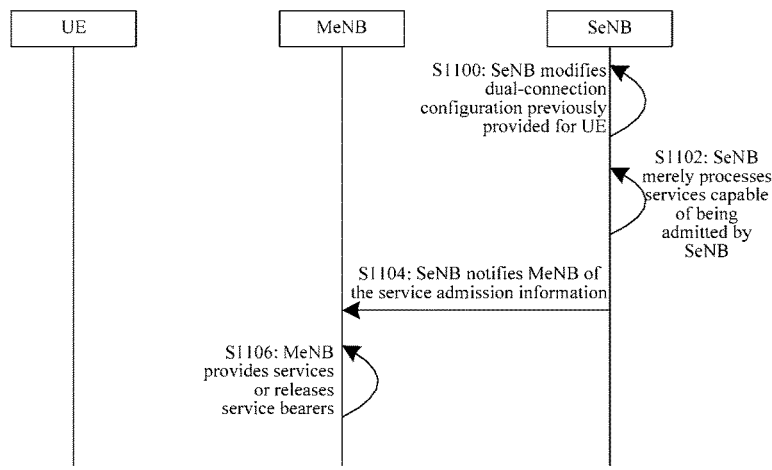
FIG. 11 is a flow chart of a communication processing method according to the fifth embodiment of the present disclosure.

FIG. 11 is a flow chart of a communication processing method according to the fifth embodiment of the present disclosure. In this embodiment, during the processing on the services previously distributed by the MeNB, the SeNB finds that it can partially accept the resource request previously transmitted by the MeNB. i.e., it can merely provide a part of the resources desired for these services. In this circumstance, the communication processing method includes the following steps.

Step S1100: the SeNB modifies the dual connection configuration previously provided for the UE.

Step S1102: the SeNB performs an admission control operation in accordance with its own resource condition. The SeNB merely performs the processing on the services capable of being admitted thereby, but does not perform any processing on the services incapable of being admitted.

Step S1104: the SeNB sends a message to the MeNB to confirm the dual-connection resource configuration provided for the UE, i.e., notifies the MeNB of the service admission information. The SeNB may notify the MeNB of the information about the bearers capable of being admitted, e.g., it may send to the MeNB a notification message carrying E-RAB List Accepted to Establish, and the information about the services capable of being admitted by the SeNB may be contained in the E-RAB List Accepted to Establish. Alternatively, the SeNB may also notify the MeNB of the information about the bearers incapable of being admitted, e.g., it may send to the MeNB a notification message carrying E-RAB List Not-Accepted, and the information about the services incapable of being accepted by the SeNB may be contained in the E-RAB List Not-Accepted.

Step S1106: after acquiring the service admission information from the SeNB, the MeNB performs the corresponding processings. For the service incapable of being admitted by the SeNB, the MeNB may provide its own resources for these services, or release these services.

Figure 12:
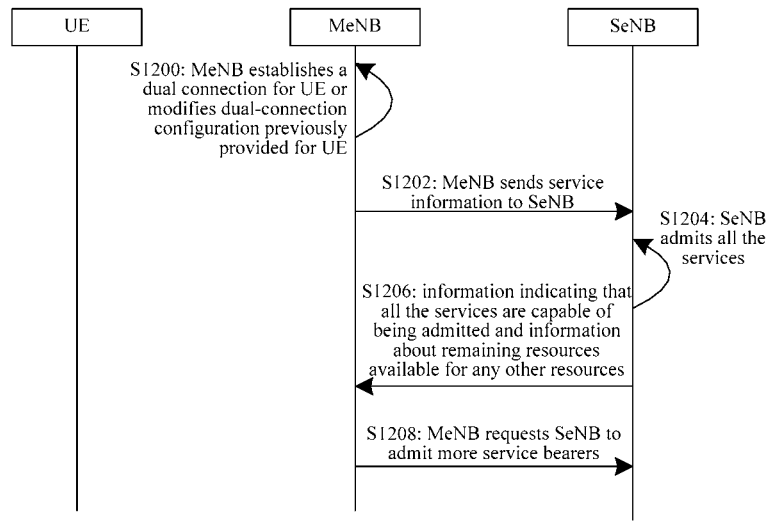
FIG. 12 is a flow chart of a communication processing method according to the sixth embodiment of the present disclosure.

FIG. 12 is a flow chart of a communication processing method according to the sixth embodiment of the present disclosure. In this embodiment, the MeNB initiates a service distribution request to the SeNB, and the SeNB can fully accept the resource distribution request and still includes remaining resources, i.e., the SeNB may provide sufficient resources for the services distributed by the MeNB and may still provide resources for any other services. In this circumstance, the communication processing method includes the following steps.

Step S1200: the MeNB establishes or modifies the dual-connection configuration previously provided for the UE.

Step S1202: in the case that the MeNB requests the SeNB to add or modify the dual-connection resource configuration for the UE, the MeNB transmits to the SeNB the service information including service bearers for the resources desired to be provided by the SeNB, and the service information may be a service bearer list carrying a request. For example, the services requested to be distributed may be stored in E-RAB List Requested to Establish, and this list may be contained in the service information transmitted to the SeNB.

Step S1204: the SeNB performs an admission control operation in accordance with its own resource condition. The SeNB may admit all the services and perform the corresponding processings.

Step S1206: the SeNB sends a message to the MeNB to confirm the dual-connection resource configuration provided for the UE, i.e., notifies the MeNB of information about the services capable of the admitted and information about the remaining resources. The SeNB may notify the MeNB of the bearers capable of being admitted, e.g., it may send to the MeNB a notification message carrying E-RAB List Accepted to Establish, and the information about the services capable of being admitted by the SeNB, including all the services requested by the MeNB to be processed by the SeNB, may be contained in the E-RAB List Accepted to Establish. Alternatively, the SeNB may also send to the MeNB a notification message carrying E-RAB List Not-Accepted, and this list is set to null, i.e., the SeNB may provide sufficient resources for the services requested by the MeNB. In addition, the SeNB may notify the MeNB of the remaining resources available for any other resources. For example, the information about the remaining resources available in the SeNB may also be contained in the notification message, or another notification message about the remaining resources available in the SeNB, e.g., a More Resource Available message, may be sent by the SeNB to the MeNB.

Step S1208: after acquiring the service admission information and the information about the remaining resources from the SeNB, the MeNB performs the corresponding processings. Because the SeNB includes the resources available for the other services, the MeNB may distribute more services to the SeNB.

Figure 13:
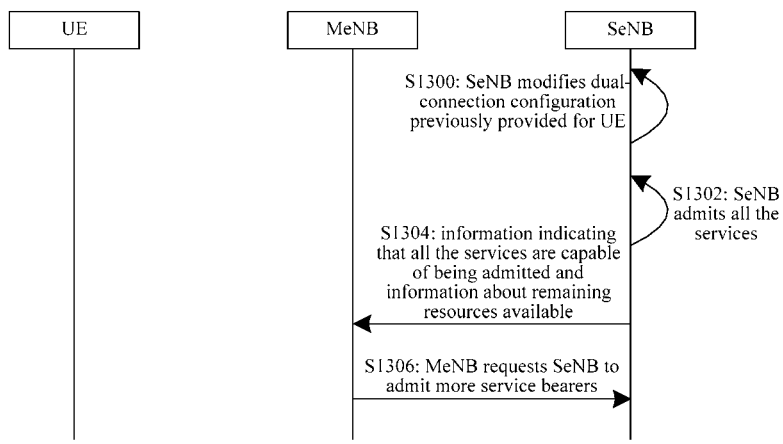
FIG. 13 is a flow chart of a communication processing method according to the seventh embodiment of the present disclosure.

FIG. 13 is a flow chart of a communication processing method according to the seventh embodiment of the present disclosure. In this embodiment, during the processing on the services previously distributed by the MeNB, the SeNB finds that it can fully accept the resource distribution request previously transmitted by the MeNB and includes remaining resources, i.e., the SeNB can provide sufficient resources for the services previously distributed by the MeNB and can still provide resources for any other services. In this circumstance, the communication processing method includes the following steps.

Step S1300: the SeNB modifies the dual-connection configuration previously provided for the UE.

Step S1302: the SeNB performs an admission control operation in accordance with its own resource condition. The SeNB may admit all the services and performs the corresponding processings.

Step S1304: the SeNB sends a message to the MeNB to confirm the dual-connection resource configuration provided for the UE, i.e., notifies the MeNB of information about the services capable of being admitted and information about the remaining resources. The SeNB may notify the MeNB of information about the bearers capable of being admitted. e.g., it may send to the MeNB a notification message carrying E-RAB List Accepted to Establish, and the information about the services capable of being admitted by the SeNB, including all the services requested by the MeNB, may be contained in the E-RAB List Accepted to Establish. Alternatively, the SeNB may send to the MeNB a notification message carrying E-RAB List Not-Accepted, and this list may be set to null, i.e., the SeNB may provide sufficient resources for the services requested by the MeNB. In addition, the SeNB may notify the MeNB of the information about the remaining resources available for any other resources. For example, the information about the remaining resources available in the SeNB may be contained in the notification message, or another notification message about the remaining resources available in the SeNB, e.g., a More Resource Available message, may be sent by the SeNB to the MeNB.

Step S1306: after acquiring the information about the services capable of being admitted and the information about the remaining resources from the SeNB, the MeNB performs the corresponding processings. Because the SeNB may provide more resources for any other services, the MeNB may distribute more services to the SeNB.

Figure 14:
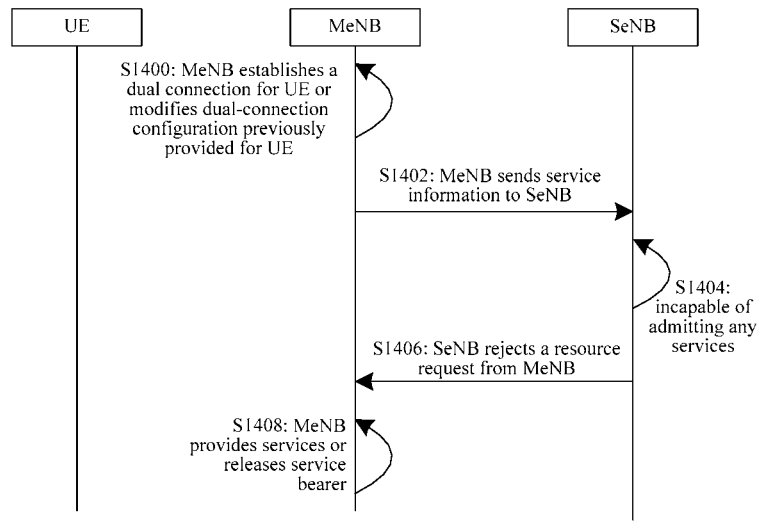
FIG. 14 is a flow chart of a communication processing method according to the eighth embodiment of the present disclosure.

FIG. 14 is a flow chart of a communication processing method according to the eighth embodiment of the present disclosure. In this embodiment, the MeNB initiates a service distribution request to the SeNB, and the SeNB cannot provide any resources for the services distributed by the MeNB. In this circumstance, the communication processing method includes the following steps.

Step S1400: the MeNB establishes a dual connection for the UE, or modifies the dual-connection configuration previously provided for the UE.

Step S1402: in the case that the MeNB requests the SeNB to add or modify the dual-connection resource configuration, the MeNB sends to the SeNB service information including service bearers for the resources to be provided by the SeNB, and the service information may be a service bearer list carrying a request. For example, the services requested to be distributed may be stored in E-RAB List Requested to Establish, and this list may be contained in the service information transmitted to the SeNB.

Step S1404: the SeNB performs an admission control operation in accordance with its own resource condition. At this time, the SeNB cannot admit any services.

Step S1406: the SeNB sends a message to the MeNB to confirm that it cannot provide any resource configuration for the UE. The SeNB may reject, in an explicit or implicit way, the resource distribution request from the MeNB. In the explicit way, the SeNB may notify the MeNB of information about the bearers capable of being admitted thereby, e.g., it may send to the MeNB a notification message carrying E-RAB List Accepted to Establish, and this list is set to null, i.e., the SeNB cannot admit any services requested by the MeNB. Alternatively, the SeNB may send to the MeNB a notification message carrying E-RAB List Not-Accepted, and information indicating that the SeNB cannot admit any services, including all the services requested by the MeNB, may be contained in the E-RAB List Not-Accepted. In addition, the SeNB may directly send to the MeNB a rejection message carrying a rejection reason, e.g., it may send an SeNB Addition/Modification Reject message or an SeNB Addition/Modification Failure message to the MeNB. In the implicit way, the SeNB may not notify the MeNB of the information about the bearers capable of being admitted, e.g., the E-RAB List Requested to Establish may not be contained in the notification message sent by the SeNB to the MeNB.

Step S1408: after acquiring the service admission information from the SeNB, the MeNB performs the corresponding processings. For the service bearers incapable of being admitted by the SeNB, the MeNB may provide its own resources for these services, or release these service bearers.

Figure 15:
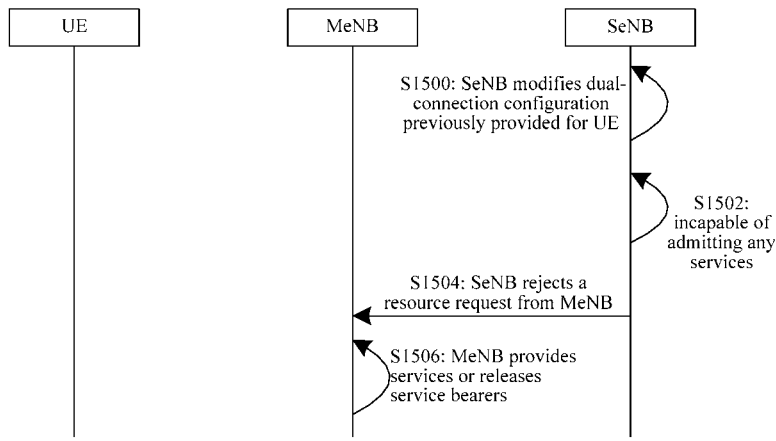
FIG. 15 is a flow chart of a communication processing method according to the ninth embodiment of the present disclosure.

FIG. 15 is a flow chart of a communication processing method according to the ninth embodiment. In this embodiment, during the processing on the services previously distributed by the MeNB, the SeNB finds that it cannot provide any resources for these services. In this circumstance, the communication processing method includes the following steps.

Step S1500: the SeNB modifies the dual-connection configuration previously provided for the UE.

Step S1502: the SeNB performs an admission control operation in accordance with its own resource condition. At this time, the SeNB cannot admit any services.

Step S1504: the SeNB sends a message to the MeNB to confirm that it cannot be provide any resource configuration for the UE. The SeNB may, in an explicit or implicit way, reject the resource distribution request from the MeNB. In the explicit way, the SeNB may notify the MeNB of information about the bearers capable of being admitted, i.e., the information indicating that the service bearers are incapable of being admitted. For example, it may send to the MeNB a notification message carrying E-RAB List Accepted to Establish, and this list may be set to null, i.e., the SeNB cannot admit any services requested by the MeNB. Alternatively, the SeNB may send to the MeNB a notification message carrying E-RAB List Not-Accepted, and the information indicating that the services are incapable of being admitted by the SeNB, including all the services requested by the MeNB, may be contained in the E-RAB List Not-Accepted. In addition, the SeNB may directly send to the MeNB a rejection message carrying a rejection reason. For example, the SeNB may send an SeNB Addition/Modification Reject message or an SeNB Addition/Modification Failure message to the MeNB. In the implicit way, the SeNB may not notify the MeNB of the information about the bearers capable of being admitted by the SeNB, e.g., the E-RAB List Requested to Establish may not be contained in the notification message transmitted by the SeNB to the MeNB.

Step S1506: after acquiring the service admission information from the SeNB, the MeNB performs the corresponding processings. For the service bearers incapable of being admitted by the SeNB, the MeNB may provide its own resources for these services, or release the service bearers.

Figure 16:
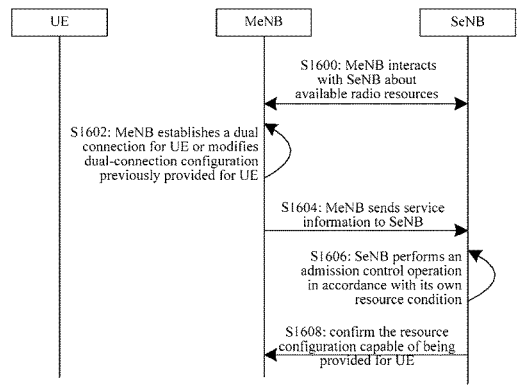
FIG. 16 is a flow chart of a communication processing method according to the tenth embodiment of the present disclosure.

FIG. 16 is a flow chart of a communication processing method according to the tenth embodiment of the present disclosure. The communication processing method includes the following steps.

Step S1600: the MeNB interacts with the SeNB about the available radio resources for a dual connection.

Step S1602: the MeNB establishes the dual connection for the UE or modifies the dual-connection configuration previously provided for the UE in accordance with the resource condition of the SeNB.

Step S1604: in the case that the MeNB requests the SeNB to add or modify the dual-connection resource configuration for the UE, the MeNB sends to the SeNB service information including service bearers for the resources to be provided by the SeNB, and the service information may be a service bearer list carrying a request. For example, the services requested to be distributed may be stored in E-RAB List Requested to Establish, and this list may be contained in the service information transmitted to the SeNB.

Step S1606: the SeNB performs an admission control operation in accordance with its own resource condition.

Step S1608: the SeNB sends a message to the MeNB to confirm the resource configuration capable of being provided for the UE.

During the interaction between the SeNB and the MeNB, e.g., in the case that one of them requests the other one to provide the dual connection resources for the UE, the resource condition may be described on the basis of E-RAB (service bearer) as granularity. However, in extreme cases where the UE merely includes one service bearer, the granularity for the resources configured between the SeNB and the MeNB may be smaller, such as a fraction of the service bearer (e.g., one third of the E-RAB resource request), or several Resource Blocks (RBs) (e.g., several Physical Resource Blocks (PRBs). In other words, in the embodiments of the present disclosure, the SeNB and the MeNB may interact with each other so as to configure the resources on the basis of, but not limited to, the service bearer.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A communication processing method for a Slave evolved NodeB (SeNB) which constitutes a dual-connection radio communication network with a Master evolved NodeB (MeNB), comprising:
   a first determination step of determining information about currently available service resources for distribution, in accordance with a resource condition;
   an admission control step of performing service admission processing on one or more first services in accordance with the information about the service resources; and
   a transmission step of transmitting service admission information indicating a service admission processing result to the MeNB,
   wherein in a case that the SeNB is incapable of admitting any service in the one or more first services, the service admission information does not carry any service identifier in a service admission list in the service admission information or does not carry a service admission list field in the service admission information.

2. The communication processing method according to claim 1, wherein in a case that the SeNB is capable of merely admitting a part of the one or more first services, the service admission information comprises first information indicating the part of the one or more first services capable of being admitted by the SeNB, and/or second information indicating a remaining part, other than the part, of the one or more first services incapable of being admitted by the SeNB.

3. The communication processing method according to claim 1, wherein the one or more first services are one or more services which are requested by the MeNB to be distributed to the SeNB, and the communication processing method further comprises a reception step of receiving from the MeNB a resource request message carrying service attribute information about the one or more first services.

4. The communication processing method according to claim 3, wherein, the service attribute information comprises one or more service identifiers, and service quality requirement information or resource requirement information corresponding to the one or more first services.

5. A communication processing method for a Master evolved NodeB (MeNB) which constitutes a dual-connection radio communication network with a Slave evolved NodeB (SeNB), comprising:
   a reception step of receiving service admission information indicating a service admission processing result obtained after the SeNB performs service admission processing on one or more first services in accordance with information about currently available service resources for distribution; and
   a processing step of performing service processing in accordance with the service admission information,
   wherein in the case that the SeNB is incapable of admitting any service in the one or more first services, the service admission information does not carry any service identifier in a service admission list in the service admission information or does not carry a service admission list field in the service admission information.

6. The communication processing method according to claim 5, wherein in a case that the SeNB is capable of merely admitting a part of the one or more first services, the service admission information comprises first information indicating the part of the one or more first services capable of being admitted by the SeNB, and/or second information indicating the remaining part, other than the part, of the one or more first services incapable of being admitted by the SeNB, and the processing step further comprises performing service processing on the remaining part of the one or more first services incapable of being admitted by the SeNB in accordance with the service admission information.

7. A communication processing apparatus for a Master evolved NodeB (MeNB) which constitutes a dual-connection radio communication network with a Slave evolved NodeB (SeNB), comprising:
   a receiver configured to receive service admission information indicating a service admission processing result obtained after the SeNB performs service admission processing on one or more first services in accordance with information about currently available service resources for distribution; and a processor configured to perform service processing in accordance with the service admission information, wherein in a case that the SeNB is incapable of admitting any service in the one or more first services, the service admission information does not carry any service identifier in a service admission list in the service admission information or does not carry a service admission list field in the service admission information.

8. The communication processing apparatus according to claim 7, wherein in the case that the SeNB is capable of merely admitting a part of the one or more first services, the service admission information comprises first information indicating the part of the one or more first services capable of being admitted by the SeNB, and/or second information indicating a remaining part, other than the part, of the one or more first services incapable of being admitted by the SeNB, and the processor is further configured to perform service processing on the remaining part of the one or more first services incapable of being admitted by the SeNB in accordance with the service admission information.

9. A base station, comprising the communication processing apparatus according to claim 7.

10. The communication processing method according to claim 1, wherein the one or more first services are one or more services that have been currently distributed to the SeNB, and the communication processing method further comprises a second determination step of determining service attribute information about the one or more first services.

11. The communication processing method according to claim 1, wherein the transmission step further comprises transmitting the service admission information to the MeNB, via an intermediate network element simultaneously connected to the SeNB and the MeNB.

12. The communication processing method according to claim 5, wherein the one or more first services are one or more services that have been currently distributed to the SeNB.

* * * * *